United States Patent
Zabaldo et al.

(10) Patent No.: US 11,451,506 B1
(45) Date of Patent: Sep. 20, 2022

(54) COMMUNICATIONS PLATFORM FOR REVEALING CONTENT OF NOTIFICATIONS AT PREDEFINED TIMES

(71) Applicant: WakieUp, LLC, Heber City, UT (US)

(72) Inventors: Nathan Zabaldo, Heber City, UT (US); Carrie Zabaldo, Heber City, UT (US)

(73) Assignee: WakieUp, LLC, Heber City, UT (US)

( * ) Notice: Subject to any disclaimer, the term of this patent is extended or adjusted under 35 U.S.C. 154(b) by 0 days.

(21) Appl. No.: 17/365,654

(22) Filed: Jul. 1, 2021

(51) Int. Cl.
- *H04L 51/224* (2022.01)
- *H04L 51/23* (2022.01)
- *H04L 51/10* (2022.01)
- *H04L 51/216* (2022.01)

(52) U.S. Cl.
CPC .......... *H04L 51/224* (2022.05); *H04L 51/10* (2013.01); *H04L 51/216* (2022.05); *H04L 51/23* (2022.05)

(58) Field of Classification Search
CPC ......... H04L 51/10; H04L 51/16; H04L 51/18; H04L 51/22; H04L 51/24; H04L 51/30; H04L 51/38; H04L 67/125; H04W 4/70; H04W 76/28; H04W 4/80; G06F 9/44573
See application file for complete search history.

(56) References Cited

U.S. PATENT DOCUMENTS

| | | | | |
|---|---|---|---|---|
| 8,171,032 B2* | 5/2012 | Herz | ................ | H04N 21/23106 707/748 |
| 8,230,343 B2* | 7/2012 | Logan | ................ | H04N 21/4622 725/39 |
| 9,298,358 B1* | 3/2016 | Wilden | ................. | G06F 3/0485 |
| 9,367,208 B2* | 6/2016 | Hicks | .................. | G06F 3/04817 |
| 10,505,871 B1* | 12/2019 | Jain | .......................... | H04L 51/42 |
| 10,536,390 B1* | 1/2020 | Green | ..................... | H04L 67/10 |
| 10,567,469 B1* | 2/2020 | Green | ..................... | H04L 47/70 |
| 11,146,670 B2* | 10/2021 | Choi | ..................... | G06F 3/0488 |
| 2009/0254550 A1* | 10/2009 | Choi | .................. | G06F 16/9038 |
| 2010/0185863 A1* | 7/2010 | Rabin | ..................... | H04L 9/085 713/171 |
| 2011/0050594 A1* | 3/2011 | Kim | ....................... | G10L 13/033 345/173 |
| 2012/0157134 A1* | 6/2012 | Lee | ....................... | H04L 51/063 455/466 |
| 2015/0088988 A1* | 3/2015 | Yuan | .................. | H04N 21/4751 709/204 |
| 2015/0095750 A1* | 4/2015 | Nishio | .................. | G06F 40/166 715/202 |
| 2015/0334061 A1* | 11/2015 | Baird | ..................... | H04L 51/23 709/206 |

(Continued)

*Primary Examiner* — Sargon N Nano
(74) *Attorney, Agent, or Firm* — Kirton McConkie; Brian Tucker

(57) ABSTRACT

A communications platform can be configured to reveal content of notifications at predefined times. When a first user sends a notification to a second user of the communications platform, the first user can provide content for the notification and specify a time when the content can be revealed to the second user. The notification can then be delivered to the second user with an indication of the specified time when the second user will be able to open the notification to reveal its content. Prior to the specified time for opening the notification, the second user can request a hint from the first user. When the hint is presented to the second user, the content of the notification can remain concealed.

10 Claims, 12 Drawing Sheets

(56) References Cited

U.S. PATENT DOCUMENTS

| | | | |
|---|---|---|---|
| 2015/0381542 A1* | 12/2015 | Coleman | H04L 51/18 709/206 |
| 2016/0163079 A1* | 6/2016 | Lee | G06Q 30/0621 345/689 |
| 2017/0041296 A1* | 2/2017 | Ford | G06F 21/64 |
| 2017/0075561 A1* | 3/2017 | Ghazanfari | G06F 3/0488 |
| 2018/0183738 A1* | 6/2018 | Parnell | G06Q 50/01 |
| 2018/0278740 A1* | 9/2018 | Choi | H04M 1/72403 |
| 2020/0053037 A1* | 2/2020 | Singh | H04L 51/22 |
| 2020/0213440 A1* | 7/2020 | Ng | H04M 1/72457 |
| 2021/0389859 A1* | 12/2021 | Tyler | G06F 1/1694 |

* cited by examiner

```
Content Data Structures 233

Content = [
  {
    ContentID = ContentID1;
    Text = null;
    Image = null;
    Audio = null;
    Video = video.mp4;
  }
  ...
  {
    ContentID = ContentID2;
    Text = "...";
    Image = image.jpg;
    Audio = null;
    Video = null;
  }
  ...
]
```

```
Notification Data Structures 232

Notifications = [
  {
    NotificationID = NotificationID1;
    Sender = UserID1;
    Recipient = UserID2;
    CreatedDate = 6/24/2021;
    OpenDate = 6/26/2021;
    Content = ContentID1;
    Cover = SomeCover;
    Hint = null;
  }
  ...
  {
    NotificationID = NotificationID2;
    Sender = UserID3;
    Receiver = UserID2;
    CreatedDate = 6/17/2021;
    OpenDate = 6/24/2021;
    Content = ContentID2;
    Cover = SomeCover;
    Hint = null;
  }
  ...
]
```

```
User Data Structures 231

Users = [
  {
    UserID = UserID1;
    FirstName = Henry;
    LastName = Armstrong;
    UserName = HArmstrong;
  }
  ...
  {
    UserID = UserID2;
    FirstName = Jenny;
    LastName = Armstrong;
    UserName = JArmstrong;
  }
  ...
]
```

*FIG. 3*

COMMUNICATIONS PLATFORM FOR REVEALING CONTENT OF NOTIFICATIONS AT PREDEFINED TIMES

CROSS-REFERENCE TO RELATED APPLICATIONS

N/A

BACKGROUND

Many communications platforms exist. For example, Apple's iMessage communications platform enables users to send messages containing a variety of content such as text, images and videos. When a user sends a message using iMessage or a similar communications platform, the message is delivered to the intended recipient for viewing in real-time.

BRIEF SUMMARY

The present invention is generally directed to a communications platform for revealing content of notifications at predefined times and to related methods and computer program products. When a first user sends a notification to a second user of the communications platform, the first user can provide content for the notification and specify a time when the content can be revealed to the second user. The notification can then be delivered to the second user with an indication of the specified time when the second user will be able to open the notification to reveal its content. Prior to the specified time for opening the notification, the second user can request a hint from the first user. When the hint is presented to the second user, the content of the notification can remain concealed.

In some embodiments, the present invention may be implemented as a method for managing notifications in a communications platform. A request to create a first notification can be received from a first client device used by a first user of the communications platform. The request can include an identification of a second user to whom the first notification is to be sent, content of the first notification and an open date defining when the content of the first notification can be revealed to the second user. The first notification can be delivered to a second client device used by the second user. Prior to the open date, the first notification can be presented to the second user via the second client device while preventing the second user from revealing the content of the first notification. Upon reaching the open date, the second user can be enabled to reveal the content of the first notification via the second client device.

In some embodiments, the present invention may be implemented as computer storage media storing computer executable instructions which when executed implement a method for managing notifications in a communications platform. Input can be received via an interface displayed on a first client device used by a first user of the communications platform. The input may identify a second user as a recipient of a notification, content for the notification and an open date for the notification. The notification can be presented to the second user via an interface displayed on a second client device used by the second user. Prior to the open date, the second user can be prevented from opening the notification to reveal the content of the notification. Upon reaching the open date, the second user can be enabled to open the notification to reveal the content of the notification.

In some embodiments, the present invention may be implemented as a communications platform that includes an application or web-based interface hosted on client devices, an API server and a storage system. The API server can be configured to interface with the application or the web-based interface hosted on the client devices and the storage system to implement a method for managing notifications in a communications platform. The method can include: receiving requests to deliver notifications, each request identifying a recipient of the respective notification, content for the respective notification and an open date for the respective notification; and delivering each of the notifications to the respective recipient while preventing the respective recipient from revealing the content for the respective notification until the respective open date.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 2 and 3 provide an example of various data structures that may be employed by a communications platform that is configured in accordance with embodiments of the present invention;

DETAILED DESCRIPTION

Figure 1A:
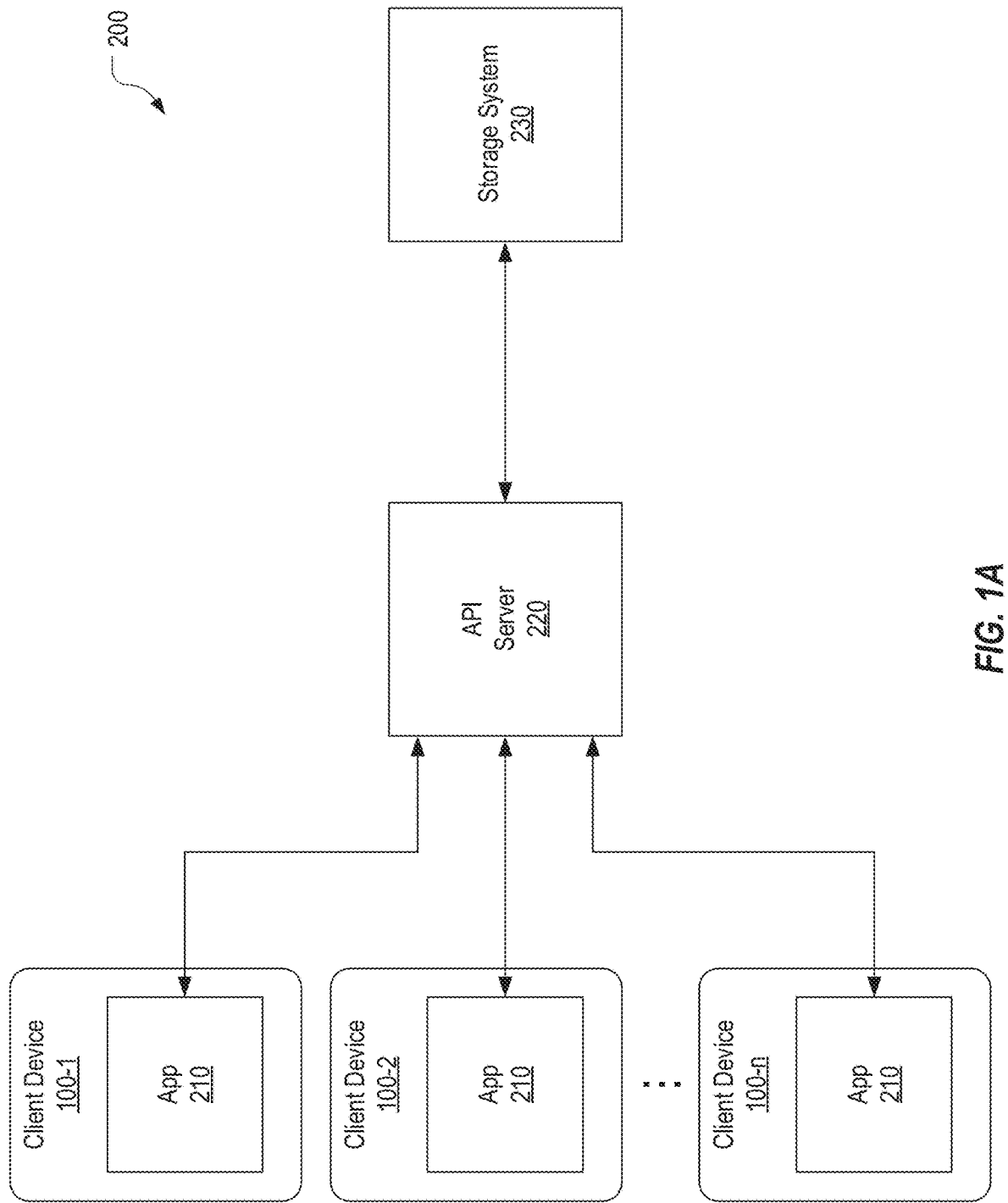
FIGS. 1A and 1B each illustrate an example of a communications platform that is configured in accordance with one or more embodiments of the present invention.
Figure 1B:
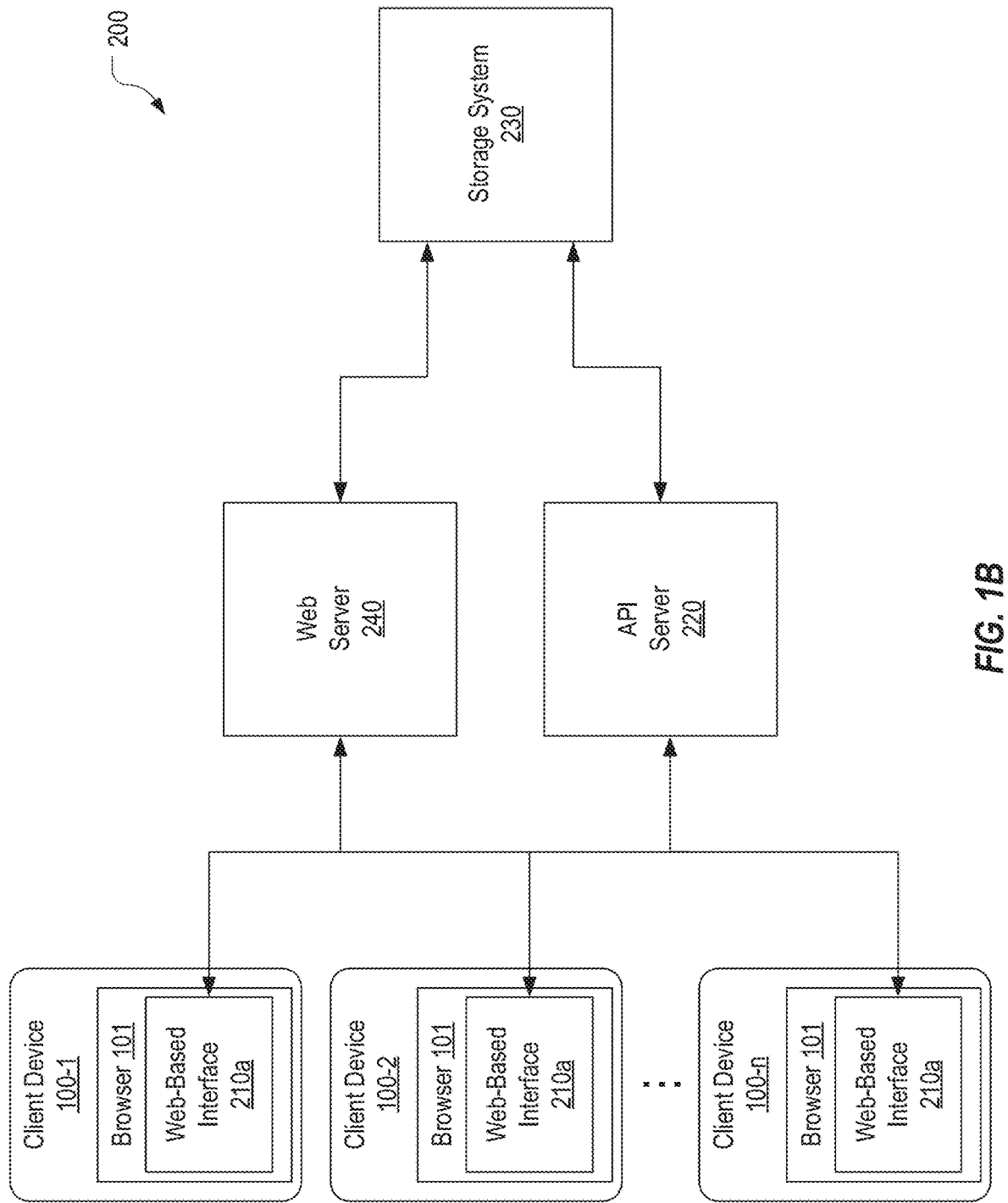

FIGS. 1A and 1B each provide an example of a communications platform 200 that is configured in accordance with one or more embodiments of the present invention. FIG. 1A represents an example in which communications platform 200 includes an application 210 that executes on client devices 100-1 through 100-n (or client device(s) 100), an API server 220 and a storage system 230. Client devices 100 can represent any computing device that a user employs to access communications platform 200. For example, client devices 100 could be the users' smart phones or tablets, in which case, application 210 may be a mobile application.

API server 220, which can be implemented using any suitable arrangement of software and/or hardware components (e.g., in the cloud or on a standalone server computing device), can provide a number of APIs by which users, via application 210, can invoke the functionality described herein. In this context, the term "API" should be construed broadly as encompassing any server-based mechanism for implementing the functionality described herein.

Storage system 230, which can also be implemented using any suitable arrangement of software and/or hardware components, can be employed to maintain a set of data structures that are uniquely configured and leveraged to enable users of communications platform 200 to send notifications to other users of communications platform 200 while concealing the content of such notifications until predefined times when the content will be revealed. In some embodiments, API server 220 can be configured to interface with storage system 230 to create and update such data structures.

FIG. 1B represents an example in which communications platform 200 includes a web-based interface 210a (e.g., a website or web application) that is hosted in a browser 101. In such cases, communications platform 200 may also include a web server 240 for providing web-based interface 210a to client devices 100. Like application 210, web-based interface 210a can employ the APIs of API server 220 to invoke the functionality described herein. The examples in FIGS. 1A and 1B are not mutually exclusive, and in some implementations of communications platform 200, users may employ either or both application 210 or web-based interface 210a to interface with communications platform 200.

Figure 2:
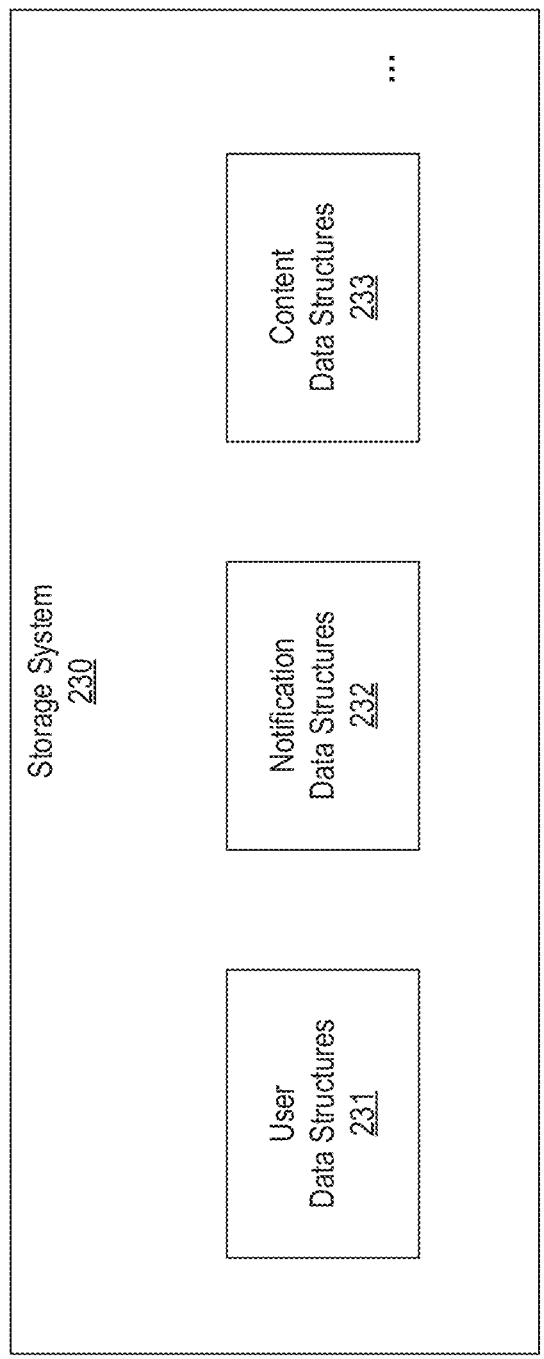

FIG. 2 provides an example of various data structures that storage system 230 may maintain in one or more embodiments of the present invention. As shown, storage system 230 may maintain user data structures 231 for defining users of communications platform 200, notification data structures 232 for defining notifications within communications platform 200, and content data structures 233 for defining content of notifications within communications platform 200, among possibly many other data structures. Although these data structures are illustrated as being separate, embodiments of the present invention encompass any arrangement and/or relationship of data structures and/or the information they define.

FIG. 3 provides examples of the type of information that data structures 231-233 may include in one or more embodiments of the present invention. As shown, user data structure 231 may represent users within communications platform 200 by defining, for each user, a userID that uniquely represents the user, the user's first and last name, a username (or display name) for the user, and possibly other information such as contact information (e.g., an email address and/or phone number), an avatar (e.g., a picture of or an image that represents the user), any user-defined special events (e.g., birthdays of other users), etc.

Notification data structures 232 may represent notifications within communications platform 200 by defining, for each notification, a notificationID that uniquely represents the notification, a sender (e.g., the userID of the user that sent/created the notification), a recipient (e.g., the userID of the user to whom the notification is/was sent), a date that the notification was created, a date that the notification can be opened by the recipient (i.e., the date that the content of the notification can be revealed to the recipient), an identifier of the content, a cover for the notification (e.g., an emoticon, image or other visual representation of the notification to be displayed to the user to whom the notification is sent), and a hint that the sender of the notification may have provided, among possibly other types of information.

Content data structures 233 may represent content of notifications within communications platform 200 by defining, for the content of each notification, a contentID that links the content to the notification and the content itself (e.g., any text, image, audio, video, etc. that the sender of the notification may have provided when creating or updating the notification).

FIG. 3 provides an example of a notification (NotificationID1) that was sent by UserID1 (Henry Armstrong) to UserID2 (Jenny Armstrong) on Jun. 24, 2021 which specifies that Jenny Armstrong cannot view/access the content (ContentID1, which includes a video) of the notification until Jun. 26, 2021. Until that predefined time, a cover (SomeCover) may be displayed to Jenny Armstrong to represent the notification. In this example, it is assumed that Henry Armstrong has not provided a hint for the notification, and therefore, the hint member of the notification in notifications data structure 232 is set to null. FIG. 3 also provides an example of a notification (NotificationID2) that was sent by UserID3 to UserID2 (Jenny Armstrong) on Jun. 17, 2021 which specifies that Jenny Armstrong cannot view/access the content (ContentID2, which includes text and an image) of the notification until Jun. 24, 2021.

Figure 4A:
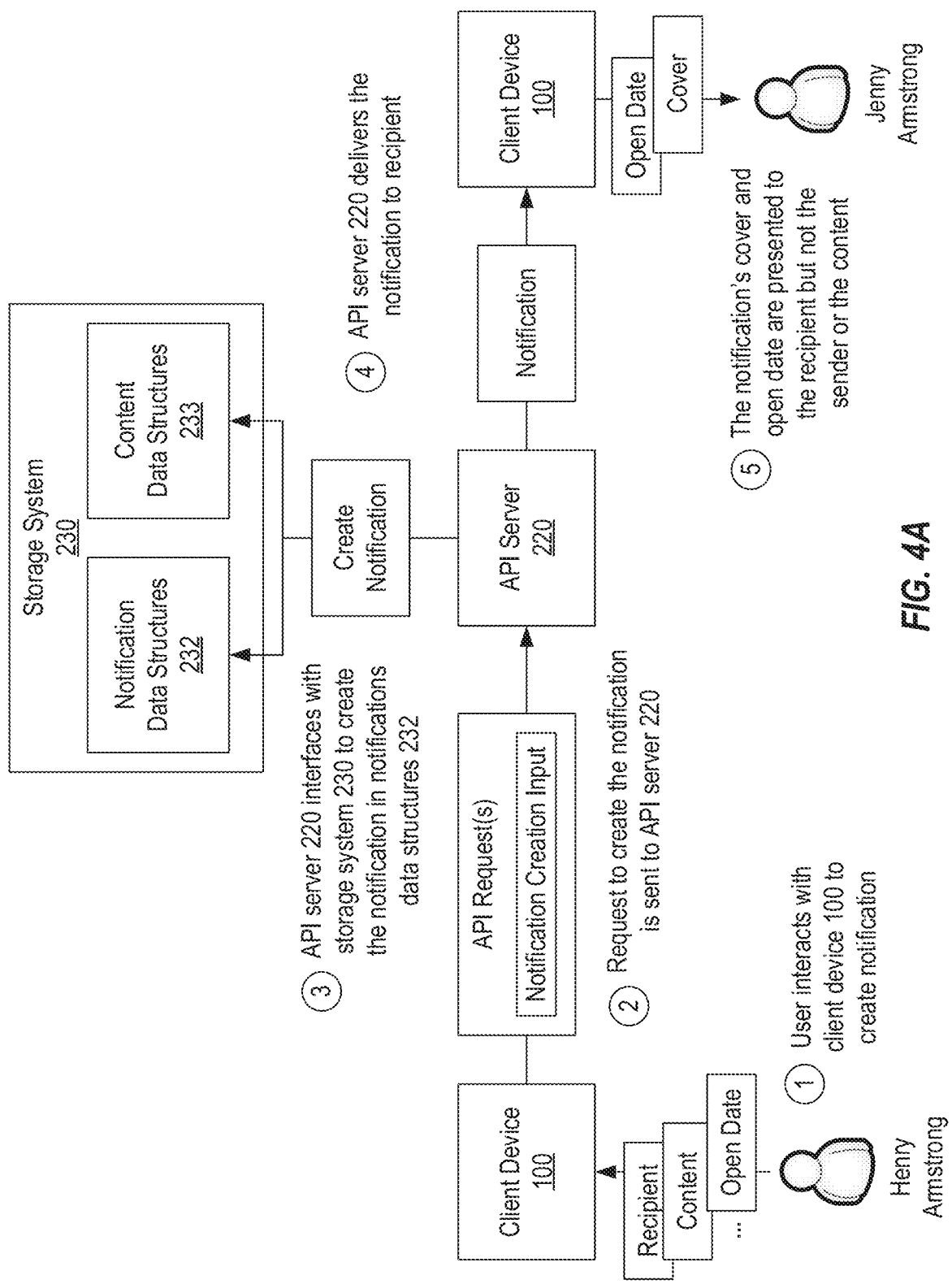
FIGS. 4A-4C provide an example of how a communications platform may enable a user to send a notification to another user without revealing the content of the notification until a specified time in accordance with one or more embodiments of the present invention.
Figure 4B:
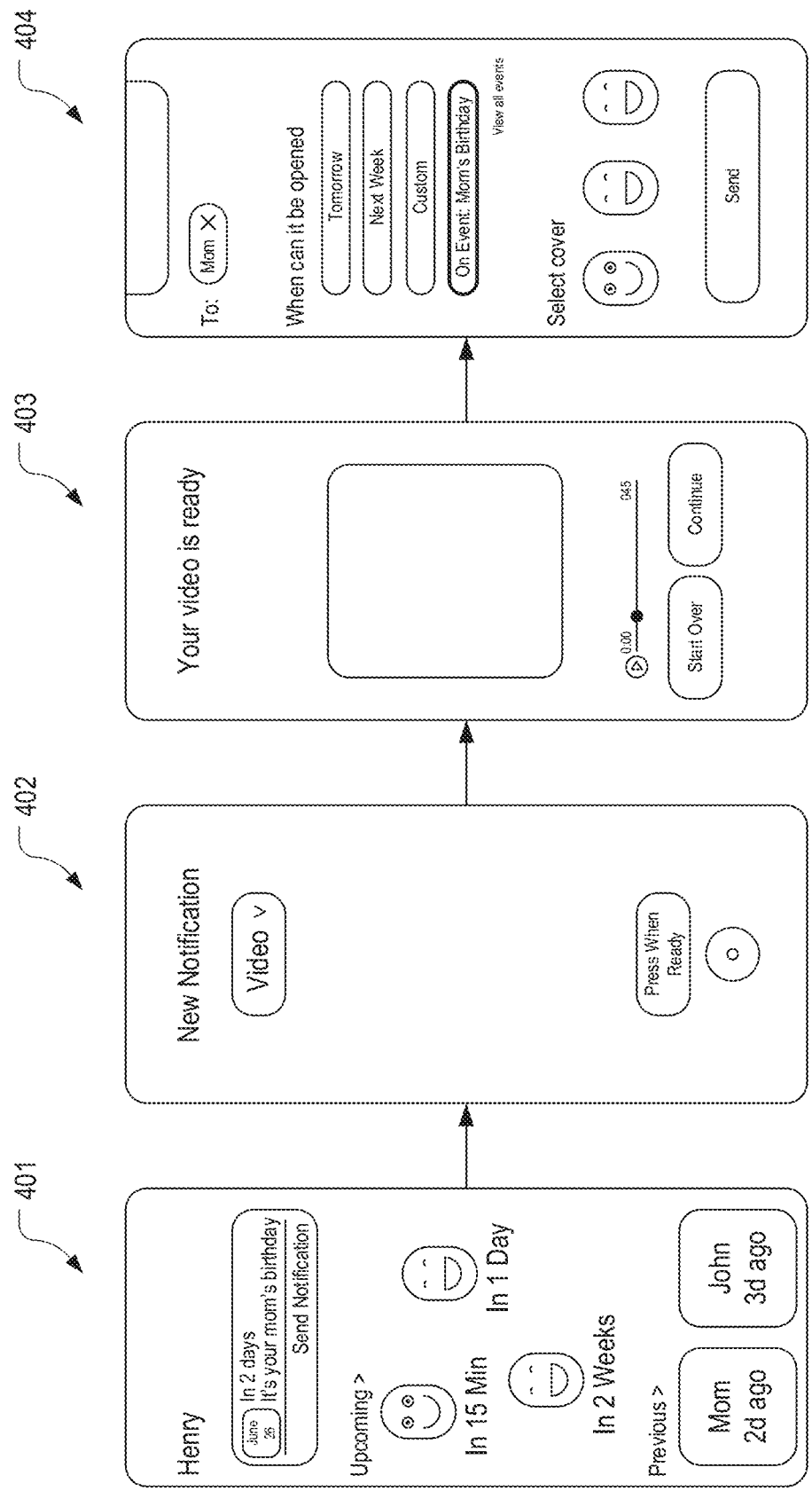
Figure 4C:
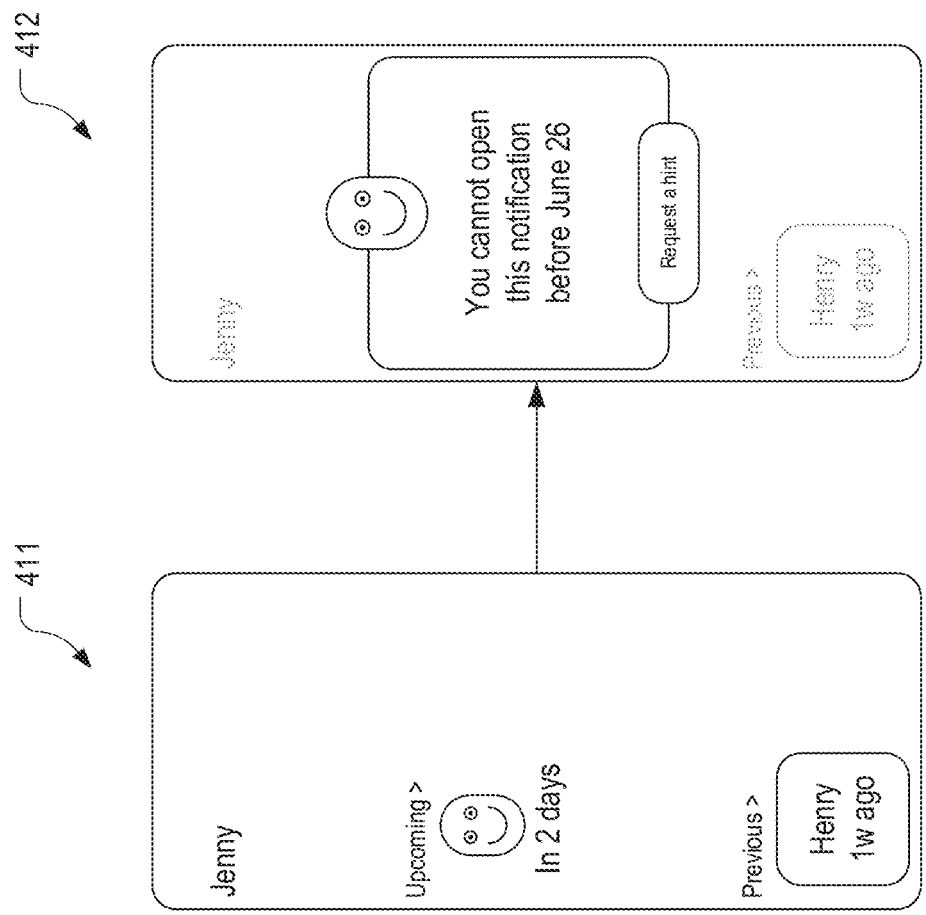

FIG. 4A provides an example of how communications platform 200 can enable a user to send a notification to another user while preventing the other user from viewing the content of the notification until a specified time. FIGS. 4B and 4C provide examples of corresponding user interfaces that communications platform 200 may present to the users. This example is based on the example notification, NotificationID1, shown in FIG. 3.

Initially, it is assumed that Henry Armstrong has accessed application 210 (or web-based interface 210a) and is logged in or has otherwise identified himself to communications platform 200. As a result, communications platform 200 could present Henry with the option of sending a notification to another user of communications platform 200. For example, as shown in FIG. 4B, application 210 could present screen 401. Screen 401 includes a reminder that Henry's mom, who is assumed to be Jenny Armstrong, is having a birthday in two days and provides an option to send a notification to her. This is merely one example, and communications platform 200 could provide the option to send notifications in any suitable way (e.g., in conjunction with displaying the user's contacts, via a dedicated screen, in response to viewing content of a notification from another user, etc.). Screen 401 also includes three covers representing three notifications that Henry has received which have not yet reached their specified open dates. Screen 401 further includes the content of two notifications that have already reached their open dates and have been viewed by Henry.

Returning to FIG. 4A, in step 1, Henry can interact with application 210 to create a notification which may entail providing/creating content and specifying a recipient and an open date. In some embodiments, creating a notification may also entail selecting/creating a cover. For example, FIG. 4B includes screens 402 and 403 by which Henry may record a video for the content of the notification to be created using client device 100. Communications platform 200 could allow a user to create, provide or otherwise specify content for a notification in any suitable manner. This content may be any type of content that is suitable for display or output on a client device 100 including text, audio, images, video, etc. FIG. 4B also includes screen 404 by which Henry may select one or more recipients for the notification (e.g., Mom—the name that Henry may have assigned to Jenny Armstrong in communications platform 200), specify the open date for the notification (e.g., Mom's birthday—a date that Henry or Jenny may have defined in communications platform 200) and select a cover to represent the notification.

As or after Henry provides input for creating the notification, in step 2, one or more API requests for creating the notification can be sent to API server 220. As shown, the API request(s) may include notification creation input such as the sender (e.g., Henry's userID), each recipient (e.g., Jenny's userID), the content, the open date, the cover, etc. Then, in step 3, API server 220 can interface with storage system 230 to create the notification within communications platform 200. For example, API server 220 may create the notification in notification data structures 232 (or multiple notifications if there are multiple recipients) and may create/store the associated content in content data structures 233.

In conjunction with accessing storage system 230 to create the notification, in step 4, API server 220 may send the notification (or otherwise make the notification available to) Jenny Armstrong. For example, API server 200 could provide the notification to application 210 running on Jenny Armstrong's client device 100. In step 5, because the notification's open date is in the future, the notification's cover and open date can be presented (or made accessible) to Jenny Armstrong while the notification's sender and content remain hidden. For example, FIG. 4C includes a screen 411 which displays a cover with an indication that the respective notification can be opened in two days. Application 210 on Jenny's client device 100 may generate/calculate this duration of time until the content of the notification can be accessed using the open date specified in the notification. If Jenny were to select the cover, a screen 412 could be displayed to confirm that Jenny cannot open the notification (i.e., cannot access the notification's content or view its sender) until the specified open date.

In some embodiments, an option to request a hint may be provided in conjunction with displaying a notification to a recipient prior to the notification's open date. For example, screen 412 in FIG. 4C includes an option to "Request a hint" that is displayed to Jenny when she selects the notification sent by Henry.

Figure 5A:
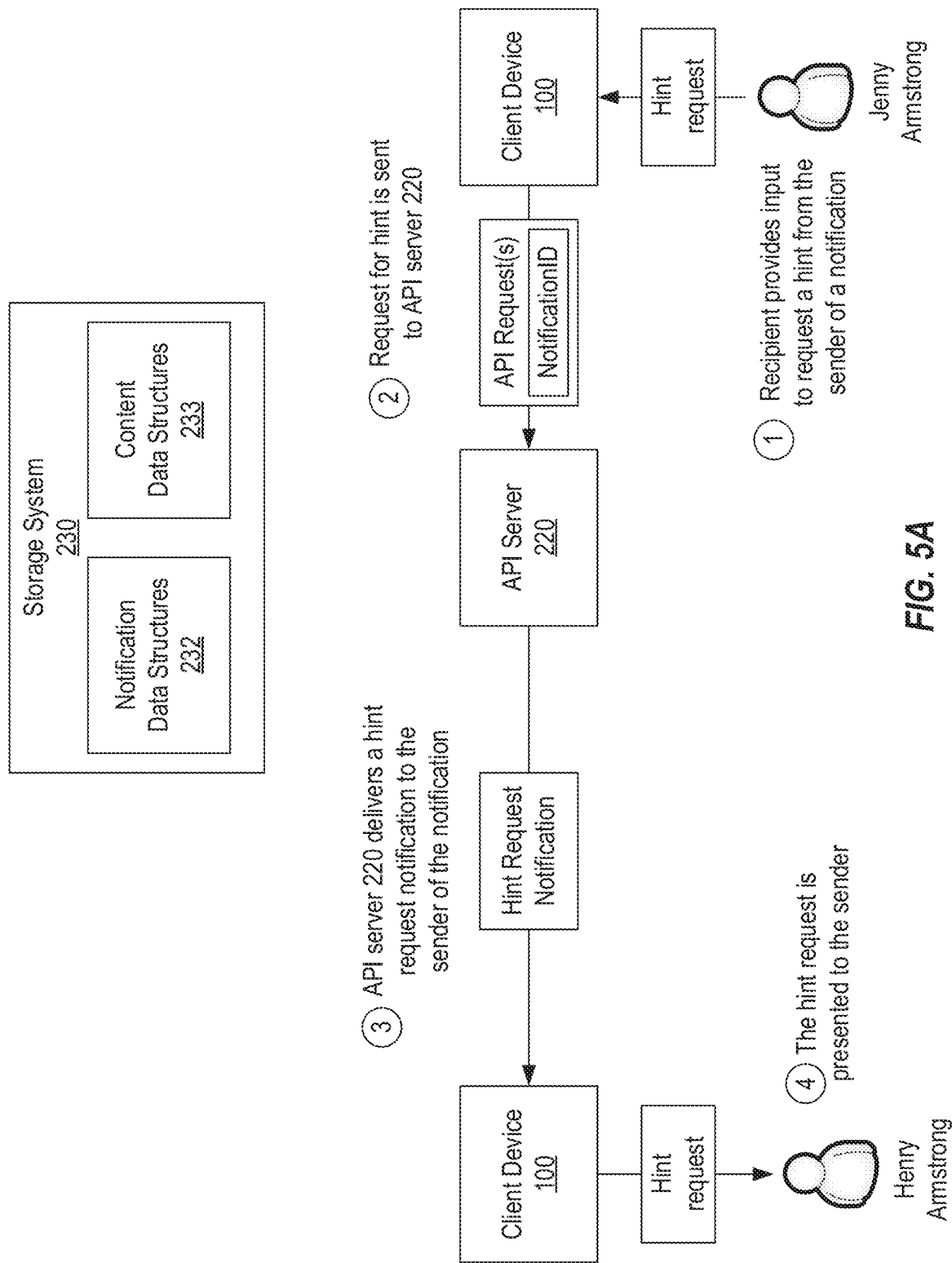
FIGS. 5A-5D provide an example of how a communications platform may enable the recipient of a notification to request a hint from the sender of a notification in accordance with one or more embodiments of the present invention.
Figure 5B:
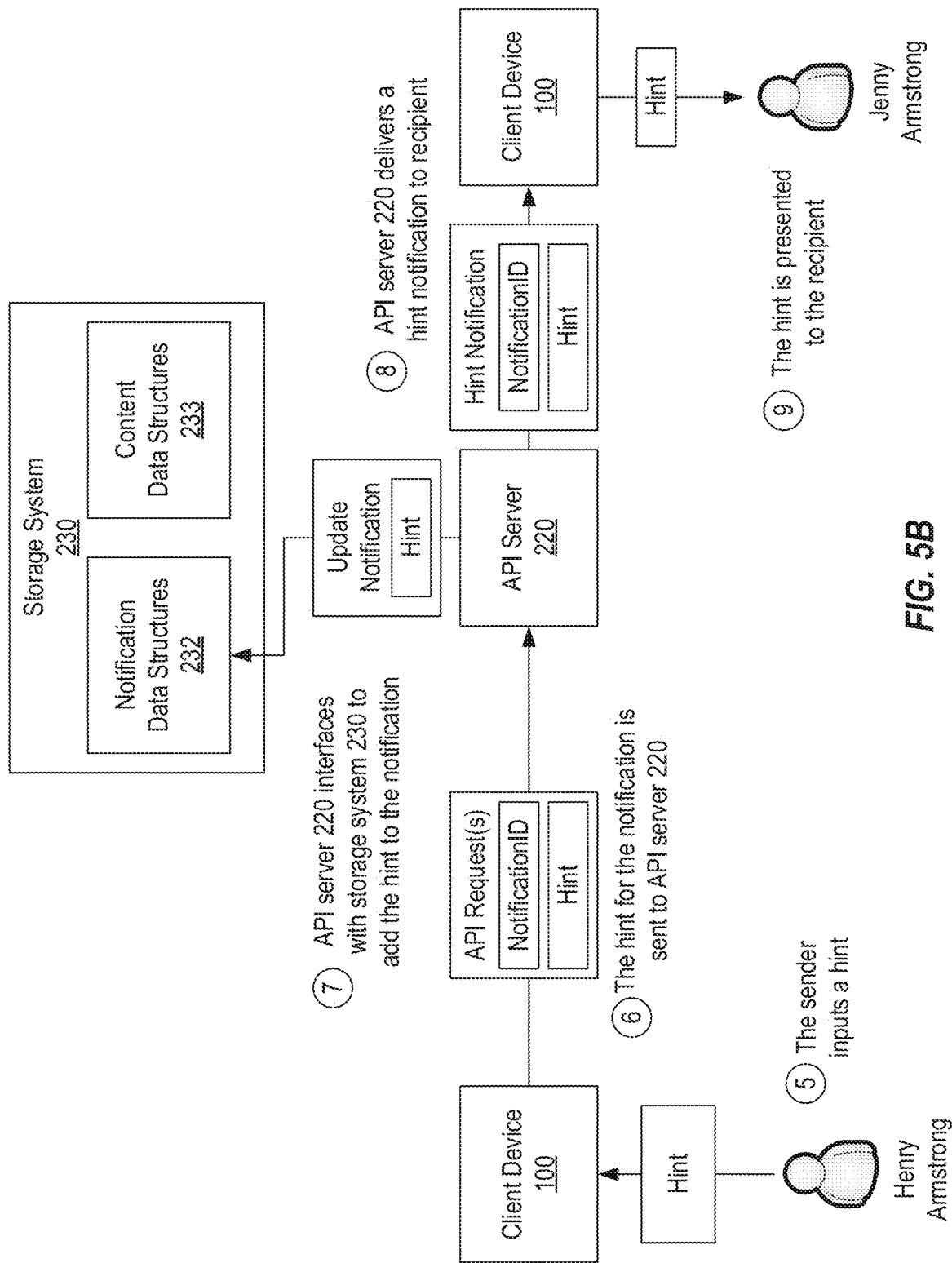
Figures 5C, 5D:
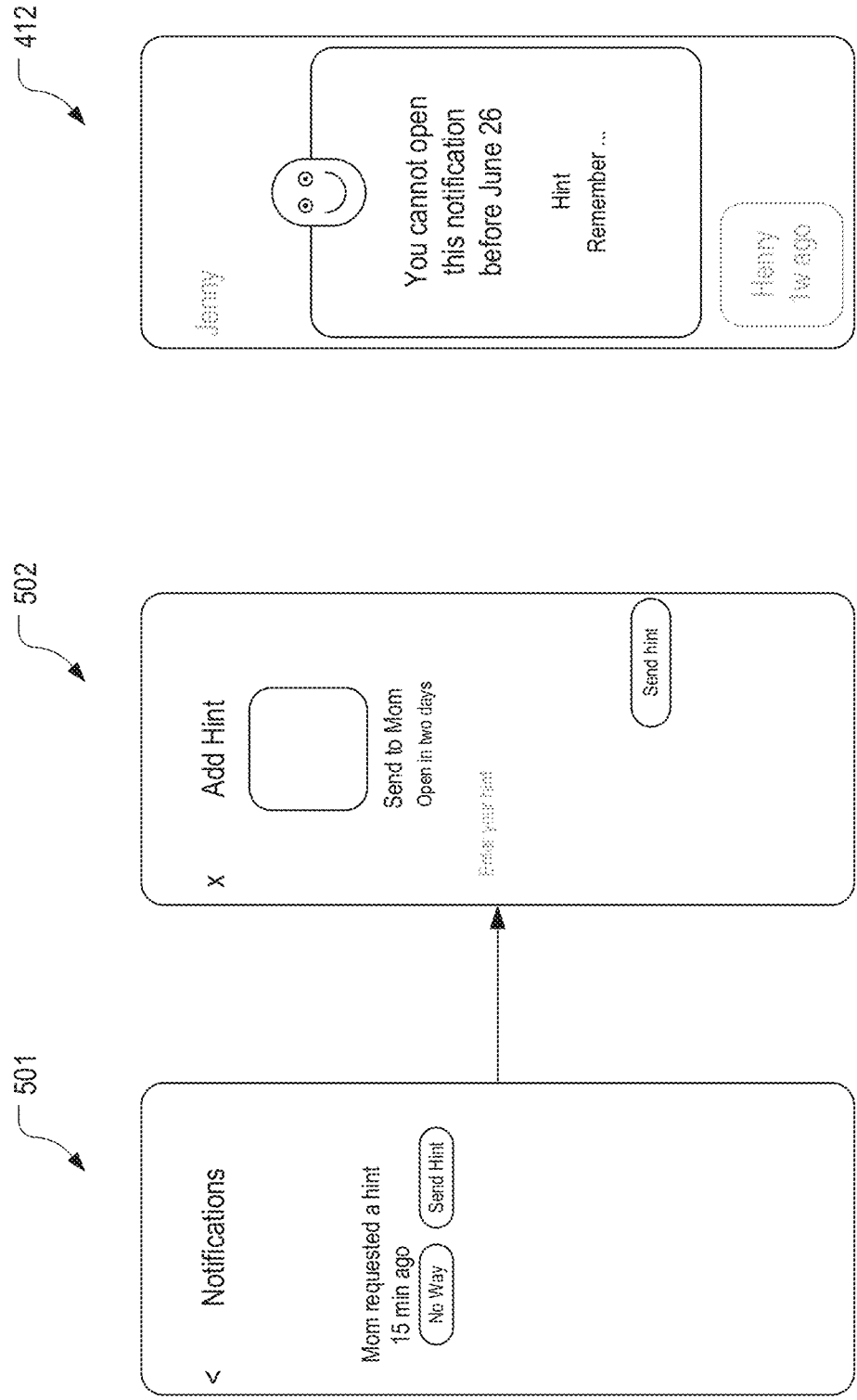

FIGS. 5A and 5B provide an example of how communications platform 200 can enable a recipient of a notification to request a hint from the sender of the notification before the content of the notification is revealed. FIGS. 5C and 5D provide examples of corresponding user interfaces that communications platform 200 may present to the users. This example is again based on the example notification, NotificationID1, shown in FIG. 3.

Turning to FIG. 5A, in step 1, it is assumed that Jenny provided input to request a hint from the sender of the notification, notificationID1, that she cannot open for two days. For example, with reference to FIG. 4C, Jenny could select the "Request a hint" button in screen 412. In step 2, one or more API requests can be sent to API server 220 to request the hint for the notification. For example, the API request(s) could specify the notificationID of the notification for which the hint was requested. In some embodiments, API server 220 could employ the notificationID to query notification data structures 232 to obtain the userID of the sender (userID1), whereas, in other embodiments, the userID of the sender could be specified in the API request(s). In any case, in step 3, API server 220 can deliver a hint request notification to the sender of the notification. For example, API server 220 could push the hint request notification to application 210 running on a client device 100 that Henry is using. Then, in step 4, the hint request can be present to Henry. For example, FIG. 5C includes a screen 501 that presents notifications to Henry. Screen 501 may specify that Mom requested a hint and may provide options for providing the hint or denying the request.

Turning to FIG. 5B, in step 5, it is assumed that Henry inputs a hint to client device 100. For example, screen 502 in FIG. 5B could be presented if Henry selects the option to send a hint and could provide a mechanism to input and send a textual hint (or other form of hint). After Henry inputs and sends the hint, in step 6, one or more API requests can be sent to API server 220 which define the hint. For example, the API request(s) may include the hint and the notificationID to which the hint pertains. In step 7, API server 220 may interface with storage system 230 to add the hint to the notification in notification data structures 232. In conjunction with step 7, API server 220 may also deliver a hint notification to the recipient (i.e., the user that requested the hint). This hint notification may include the hint and may specify the notificationID of the notification to which it pertains. Then, in step 9, the hint can be presented to the recipient. For example, FIG. 5D shows screen 412 after it has been updated to include the hint. Notably, even when the hint is displayed to the recipient, the content and sender of the notification remain concealed and cannot be revealed until the specified date.

Figure 6A:
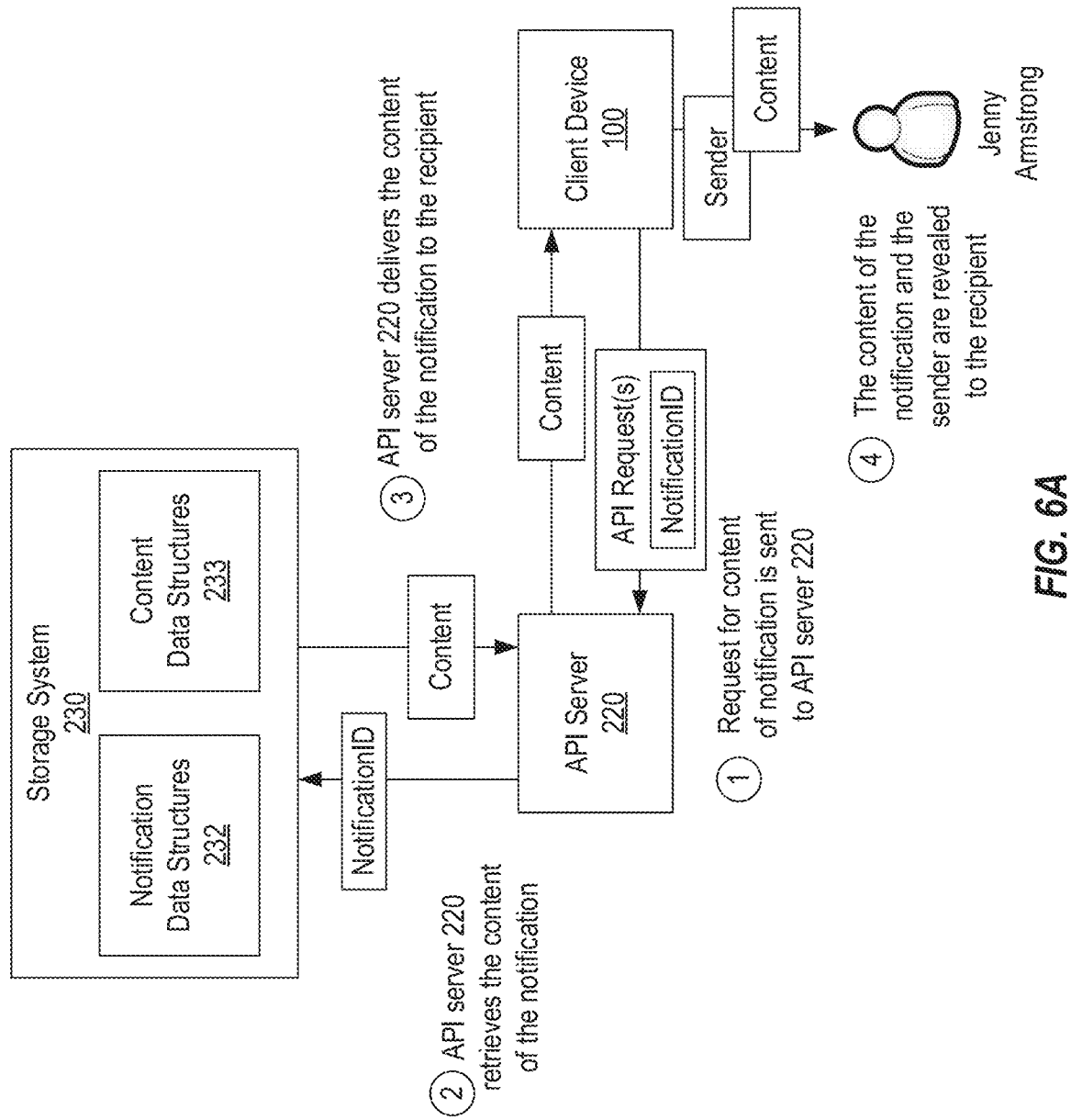
FIGS. 6A and 6B provide an example of how a communications platform can enable a recipient to reveal the content of a notification after the specified open date for the notification has been reached.
Figure 6B:
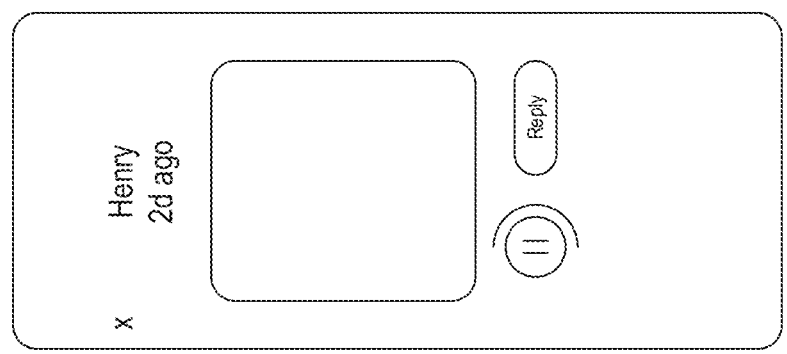

FIG. 6A provides an example of how communications platform 200 can reveal the content of a notification to a recipient once a specified date has been reached. FIG. 6B provides an example of a corresponding user interface that communications platform 200 may present to the recipient. This example is again based on the example notification, NotificationID1, shown in FIG. 3.

Turning to FIG. 6A, in step 1, one or more API requests can be sent to API server 220 to request the content of the notification. The API request(s) may include the notificationID of the notification for which the content is being requested. In some embodiments, this step may be performed in response to the recipient selecting to access the content of the notification after the specified open date has been reached. However, the timing of this step is not essential to embodiments of the present invention as long as the content remains concealed until the open date specified for the notification.

In step 2, API server 220 may interface with storage system 230 to obtain the content of the notification. For example, API server 220 could use the notificationID to obtain the contentID from notification data structures 232 and may then query content data structures 233 using the contentID to retrieve all content associated with the notification. Although not shown, in some embodiments, step 2 could entail retrieving information about the sender of the notification (e.g., the sender's userID, name, username, etc.). However, such information could have been retrieved at a previous time or otherwise separately from retrieving the content.

In step 3, API server 220 may deliver the content of the notification to application 210 on client device 100. In some embodiments, the information about the sender may also be delivered with the content if not separately delivered. Finally, in step 4, the content of the notification and the sender can be revealed to the recipient. For example, FIG. 6B includes a screen 601 that may be presented to Jenny when she requests that the notification be opened. Screen 601 identifies the sender of the opened notification (Henry), states when the notification was sent (two days ago), includes a mechanism for presenting the content of the opened notification (a video player and controls) and includes an option to send a notification in reply to the opened notification.

As can be seen, a communications platform configured in accordance with embodiments of the present invention enables users to send notifications to one another in new and unique ways. The communications platform can enhance the performance and usefulness of communications systems by enabling the senders of notifications to control when the recipients of the notifications will obtain access to the content of the notifications. For example, the communication platform can provide added security and secrecy to content that users send to one another.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing notifications in a communications platform, the method comprising:
    receiving, from an application or web-based interface hosted on a first client device, a first set of one or more API requests that include notification creation input for a first notification, the notification creation input including an identifier of a first user as a sender of the first notification, an identifier of a second user as a recipient of the first notification, an open date for the first notification, content of the first notification, and a cover for the first notification;
    in response to receiving the first set of one or more API requests, creating a first entry in one or more notification data structures and a second entry in one or more content data structures, the first entry including a notification identifier for the first entry, the identifier of the first user as the sender of the first notification, the identifier of the second user as the recipient of the first notification, the open date for the first notification, a content identifier of the second entry, and the cover for the first notification, the second entry including the content identifier for the second entry and the content of the first notification;
    also in response to receiving the first set of one or more API requests, sending the first notification to an application or web-based interface hosted on a second client device, wherein the application or web-based interface hosted on the second client device presents the cover of the first notification and the open date for the first notification but prevents the second user from revealing the sender of the first notification and the content of the first notification prior to the open date;
    receiving, from the application or web-based interface hosted on the second client device, a second set of one or more API requests that define a request for a hint for the first notification and include the notification identifier for the first entry;
    in response to receiving the second set of one or more API requests, extracting the notification identifier for the first entry and using the notification identifier for the first entry to locate the first entry in the notification data structures;
    obtaining the identifier of the first user from the first entry and using the identifier of the first user to send a hint request notification to the application or web-based interface hosted on the first client device causing the application or web-based interface hosted on the first client device to present the request for the hint to the first user and thereafter receive the hint from the first user;
    receiving, from the application or web-based interface hosted on the first client device, a third set of one or more API requests that include the notification identifier for the first entry and the hint received from the first user;
    in response to receiving the third set of one or more API requests, extracting the notification identifier for the first entry and using the notification identifier for the first entry to locate the first entry in the notification data structures and add the hint to the first entry;
    also in response to receiving the third set of one or more API requests, sending a hint notification to the application or web-based interface hosted on the second client device, the hint notification including the notification identifier for the first entry and the hint causing the application or web-based interface hosted on the second client device to present the hint in conjunction with the first notification while continuing to prevent the second user from revealing the sender of the first notification and the content of the first notification prior to the open date;

after reaching the open date, receiving, from the application or web-based interface hosted on the second client device, a fourth set of one or more API requests that define a request for the sender of the first notification and the content of the first notification and include the notification identifier for the first entry;

in response to receiving the fourth set of one or more API requests, extracting the notification identifier for the first entry and using the notification identifier for the first entry to locate the first entry in the notification data structures and obtain, from the first entry, the sender of the first notification and the content identifier of the second entry;

using the content identifier of the second entry to locate the second entry in the content data structures and obtain the content of the first notification; and sending, to the application or web-based interface hosted on the second client device, the sender of the first notification and the content of the first notification causing the sender and the content to be revealed to the second user only after reaching the open date.

2. The method of claim 1, wherein the content includes one or more of text, one or more images, audio or video.

3. The method of claim 1, wherein the notification creation input also includes an identifier of a third user as a recipient of the first notification, the method further comprising:

in response to receiving the first set of one or more API requests, creating a third entry in the notification data structures, the third entry including a notification identifier for the third entry, the identifier of the first user as the sender of the first notification, the identifier of the third user as the recipient of the first notification, the open date for the first notification, a content identifier of the second entry, and the cover for the first notification; and also in response to receiving the first set of one or more API requests, sending the first notification to the application or web-based interface hosted on a third client device, wherein the application or web-based interface hosted on the third client device presents the cover of the first notification and the open date for the first notification but prevents the third user from revealing the sender of the first notification and the content of the first notification prior to the open date.

4. The method of claim 1, wherein the open date is a birthday of the second user.

5. One or more computer storage media storing computer executable instructions which when executed implement a method for managing notifications in a communications platform, the method comprising:

receiving, from an application or web-based interface hosted on a first client device, a first set of one or more API requests that include notification creation input for a first notification, the notification creation input including an identifier of a first user as a sender of the first notification, an identifier of a second user as a recipient of the first notification, an open date for the first notification, content of the first notification, and a cover for the first notification;

in response to receiving the first set of one or more API requests, creating a first entry in one or more notification data structures and a second entry in one or more content data structures, the first entry including a notification identifier for the first entry, the identifier of the first user as the sender of the first notification, the identifier of the second user as the recipient of the first notification, the open date for the first notification, a content identifier of the second entry, and the cover for the first notification, the second entry including the content identifier for the second entry and the content of the first notification;

also in response to receiving the first set of one or more API requests, sending the first notification to an application or web-based interface hosted on a second client device, wherein the application or web-based interface hosted on the second client device presents the cover of the first notification and the open date for the first notification but prevents the second user from revealing the sender of the first notification and the content of the first notification prior to the open date;

receiving, from the application or web-based interface hosted on the second client device, a second set of one or more API requests that define a request for a hint for the first notification and include the notification identifier for the first entry;

in response to receiving the second set of one or more API requests, extracting the notification identifier for the first entry and using the notification identifier for the first entry to locate the first entry in the notification data structures;

obtaining the identifier of the first user from the first entry and using the identifier of the first user to send a hint request notification to the application or web-based interface hosted on the first client device causing the application or web-based interface hosted on the first client device to present the request for the hint to the first user and thereafter receive the hint from the first user;

receiving, from the application or web-based interface hosted on the first client device, a third set of one or more API requests that include the notification identifier for the first entry and the hint received from the first user;

in response to receiving the third set of one or more API requests, extracting the notification identifier for the first entry and using the notification identifier for the first entry to locate the first entry in the notification data structures and add the hint to the first entry;

also in response to receiving the third set of one or more API requests, sending a hint notification to the application or web-based interface hosted on the second client device, the hint notification including the notification identifier for the first entry and the hint causing the application or web-based interface hosted on the second client device to present the hint in conjunction with the first notification while continuing to prevent the second user from revealing the sender of the first notification and the content of the first notification prior to the open date;

after reaching the open date, receiving, from the application or web-based interface hosted on the second client device, a fourth set of one or more API requests that define a request for the sender of the first notification and the content of the first notification and include the notification identifier for the first entry;

in response to receiving the fourth set of one or more API requests, extracting the notification identifier for the first entry and using the notification identifier for the first entry to locate the first entry in the notification data structures and obtain, from the first entry, the sender of the first notification and the content identifier of the second entry;

using the content identifier of the second entry to locate the second entry in the content data structures and obtain the content of the first notification; and sending, to the application or web-based interface hosted on the second client device, the sender of the first notification and the content of the first notification causing the sender and the content to be revealed to the second user only after reaching the open date.

6. The computer storage media of claim 5, wherein the notification creation input also includes an identifier of a third user as a recipient of the first notification, the method further comprising:

in response to receiving the first set of one or more API requests, creating a third entry in the notification data structures, the third entry including a notification identifier for the third entry, the identifier of the first user as the sender of the first notification, the identifier of the third user as the recipient of the first notification, the open date for the first notification, a content identifier of the second entry, and the cover for the first notification; and also in response to receiving the first set of one or more API requests, sending the first notification to the application or web-based interface hosted on a third client device, wherein the application or web-based interface hosted on the third client device presents the cover of the first notification and the open date for the first notification but prevents the third user from revealing the sender of the first notification and the content of the first notification prior to the open date.

7. The computer storage media of claim 5, wherein the content includes one or more of text, one or more images, audio or video.

8. A communications platform comprising:
an application or web-based interface hosted on client devices including a first client device used by a first user and a second client device used by a second user;
an API server; and
a storage system that stores user data structures, notification data structures, and content data structures;
wherein the API server is configured to interface with the application or the web-based interface hosted on the client devices and the storage system to implement a method for managing notifications in a communications platform, the method comprising:

receiving, from the application or web-based interface hosted on the first client device, a first set of one or more API requests that include notification creation input for a first notification, the notification creation input including an identifier of the first user as a sender of the first notification, an identifier of a second user as a recipient of the first notification, an open date for the first notification, content of the first notification, and a cover for the first notification;

in response to receiving the first set of one or more API requests, creating a first entry in the notification data structures and a second entry in the content data structures, the first entry including a notification identifier for the first entry, the identifier of the first user as the sender of the first notification, the identifier of the second user as the recipient of the first notification, the open date for the first notification, a content identifier of the second entry, and the cover for the first notification, the second entry including the content identifier for the second entry and the content of the first notification;

also in response to receiving the first set of one or more API requests, sending the first notification to the application or web-based interface hosted on the second client device, wherein the application or web-based interface hosted on the second client device presents the cover of the first notification and the open date for the first notification but prevents the second user from revealing the sender of the first notification and the content of the first notification prior to the open date;

receiving, from the application or web-based interface hosted on the second client device, a second set of one or more API requests that define a request for a hint for the first notification and include the notification identifier for the first entry;

in response to receiving the second set of one or more API requests, extracting the notification identifier for the first entry and using the notification identifier for the first entry to locate the first entry in the notification data structures;

obtaining the identifier of the first user from the first entry and using the identifier of the first user to send a hint request notification to the application or web-based interface hosted on the first client device causing the application or web-based interface hosted on the first client device to present the request for the hint to the first user and thereafter receive the hint from the first user;

receiving, from the application or web-based interface hosted on the first client device, a third set of one or more API requests that include the notification identifier for the first entry and the hint received from the first user;

in response to receiving the third set of one or more API requests, extracting the notification identifier for the first entry and using the notification identifier for the first entry to locate the first entry in the notification data structures and add the hint to the first entry;

also in response to receiving the third set of one or more API requests, sending a hint notification to the application or web-based interface hosted on the second client device, the hint notification including the notification identifier for the first entry and the hint causing the application or web-based interface hosted on the second client device to present the hint in conjunction with the first notification while continuing to prevent the second user from revealing the sender of the first notification and the content of the first notification prior to the open date;

after reaching the open date, receiving, from the application or web-based interface hosted on the second client device, a fourth set of one or more API requests that define a request for the sender of the first notification and the content of the first notification and include the notification identifier for the first entry;

in response to receiving the fourth set of one or more API requests, extracting the notification identifier for the first entry and using the notification identifier for the first entry to locate the first entry in the notification data structures and obtain, from the first entry, the sender of the first notification and the content identifier of the second entry;

using the content identifier of the second entry to locate the second entry in the content data structures and obtain the content of the first notification; and sending, to the application or web-based interface hosted on the second client device, the sender of the first notification and the content of the first notification causing the sender and the content to be revealed to the second user only after reaching the open date.

9. The communications platform of claim 8, wherein the notification creation input also includes an identifier of a third user as a recipient of the first notification, the method further comprising:

in response to receiving the first set of one or more API requests, creating a third entry in the notification data structures, the third entry including a notification identifier for the third entry, the identifier of the first user as the sender of the first notification, the identifier of the third user as the recipient of the first notification, the open date for the first notification, a content identifier of the second entry, and the cover for the first notification; and also in response to receiving the first set of one or more API requests, sending the first notification to the application or web-based interface hosted on a third client device, wherein the application or web-based interface hosted on the third client device presents the cover of the first notification and the open date for the first notification but prevents the third user from revealing the sender of the first notification and the content of the first notification prior to the open date.

10. The communications platform of claim 8, wherein the content includes one or more of text, one or more images, audio or video.

* * * * *